United States Patent Office 2,892,844
Patented June 30, 1959

2,892,844

THE GAMMA-MONOLACTONE OF 4,8-DIHYDROXYOCTANOIC ACID, ITS PREPARATION AND USE

Howard E. Holmquist, Wilmington, Del., assignor to E. I. du Pont de Nemours and Company, Wilmington, Del., a corporation of Delaware No Drawing. Application May 10, 1956
Serial No. 583,941

8 Claims. (Cl. 260—343.6)

This invention relates to new organic chemical compounds and methods for making them. More particularly this invention relates to a new monolactone alcohol of 4,8-dihydroxyoctanoic acid, a method for its preparation and to a process for converting this new compound to an open-chain trihydric alcohol.

In my copending U.S. patent application Serial No. 488,991, filed February 17, 1955, now abandoned, of which Serial No. 579,459, filed April 20, 1956, is a continuation-in-part octane-1,8-diols are obtained when the dilactone corresponding to $C_8H_4O_4$ is hydrogenated at a temperature of at least 225° C. with a copper chromite catalyst. The dilactone corresponding to $C_8H_4O_4$ is the unsaturated dilactone [$\Delta^{2,2'(5H,5'H)}$-bifuran]-5,5'-dione which is obtained by reacting acetylene with carbon monoxide over a cobalt carbonyl catalyst, as disclosed and claimed in the copending patent application of J. C. Sauer, Serial No. 432,599, filed May 26, 1954, now abandoned of which Serial No. 549,155, filed November 25, 1955, now U.S. Patent No. 2,840,570, issued June 24, 1958, is a continuation-in-part.

It is an object of this invention to provide a new organic chemical compound and a method for its preparation. A further object is to provide a new monolactone alcohol of 4,8-dihydroxyoctanoic acid, and a method for its preparation. A still further object is to provide a method for obtaining a new monolactone alcohol from the unsaturated dilactone corresponding to $C_8H_4O_4$. Another object is to provide a new monolactone alcohol which is convertible to a straight-chain polyhydric aliphatic alcohol useful in preparing polyesters. Still another object is to provide a process for converting the new monolactone alcohol to an open-chain saturated aliphatic trihydric alcohol. Other objects will appear hereinafter.

These and other objects of this invention are accomplished by providing the new chemical compound, gamma-(delta-hydroxybutyl)butyrolactone corresponding to the formula:

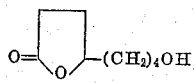

It has now been found that if ruthenium is used instead of copper chromite as the catalyst in the hydrogenation of the unsaturated dilactone $C_8H_4O_4$, the reaction is selective at one of the rings and there is obtained as a resulting product the new monolactone alcohol, gamma - (delta - hydroxybutyl)butyrolactone. This new monolactone alcohol is obtained by heating and hydrogenating [$\Delta^{2,2'(5H,5'H)}$-bifuran]-5,5'-dione with hydrogen in contact with a ruthenium catalyst, at a temperature of 200 to 250° C., under a pressure of at least 1000 lbs./sq. in. 1,4,8-octanetriol is obtained by heating gamma-(delta-hydroxybutyl)butyrolactone with hydrogen in contact with a copper chromite catalyst, at a temperature of 200 to 250° C., under a pressure of at least 1000 lbs./sq. in.

In a convenient way for preparing the gamma-(delta-hydroxybutyl)butyrolactone of this invention, a pressure reactor is charged with the unsaturated dilactone, $C_8H_4O_4$, a reaction medium, and at least 0.5% of an active ruthenium catalyst. The reactor is swept with oxygen-free nitrogen, placed on an agitating rack, hydrogen is injected and the charge agitated and heated to a temperature of 200 to 250° C. The pressure within the reactor is then adjusted to at least 1000 lbs./sq. in. After reaction is complete, as evidenced by cessation of pressure drop, the reactor is permitted to cool, opened, discharged, and the contents filtered. The desired gamma-(delta-hydroxybutyl)butyrolactone is isolated by fractional distillation or other methods known to those skilled in the art.

The example which follows is submitted to illustrate and not to limit this invention.

Example

A mixture of 23.0 g. (0.04 mole) of the dilactone $C_8H_4O_4$, ([$\Delta^{2,2'(5H,5'H)}$-bifuran]-5,5'-dione), prepared as described hereinafter, 200 ml. of dioxane and 0.23 g. of ruthenium dioxide was heated at 200° C. with hydrogen for 4.5 hours under a pressure of 1000 to 3000 lb./sq. in. During a 4.5 hour reaction period there was a total hydrogen absorption of 800 to 1000 lb./sq. in., as measured by the pressure drop. The product was distilled to give 8.1 g. of crude gamma-(delta-hydroxybutyl)butyrolactone, boiling at 155° C./1 mm., 11.3 g. of tetrahydro-[2,2'-bifuran]-5,5'-(2H,2'H)-dione, B.P. 170–190° C./1 mm., and a residue amounting to 2.9 g. The 8.1 g. fraction of gamma-(delta-hydroxybutyl)butyrolactone was redistilled to give a main fraction, B.P. 140°–142° C./0.5 mm., $n_D^{25}$ 1.4650, which analyzed as follows:

*Analysis.*—Calc'd for $C_8H_{14}O_3$: C, 60.74; H, 8.92; Sap. Eq., 158; Hydroxyl No. 354. Found: C, 59.51, 59.74; H, 9.23, 9.63; Sap. Eq., 158; Hydroxyl No. 378.

Infrared analysis showed bands at 2.95μ (for —OH), 3.4μ (for saturated —CH), and 5.65μ (for lactone carbonyl).

Hydrogenation of the gamma-(delta-hydroxybutyl)butyrolactone, prepared as above, over barium copper chromite yielded 1,4,8-octanetriol, as illustrated below.

To a solution of 3.6 g. of the gamma-(delta-hydroxybutyl)butyrolactone, prepared as in the above example, in 150 ml. of dioxane there was added 1.4 g. of copper barium chromite and the mixture heated at 225° C. and 3000 lb./sq. in. hydrogen pressure for 2.5 hours. The reaction mixture was permitted to cool, filtered to remove the catalyst, and the filtrate concentrated by distillation. The thick oily product obtained was then submitted to fractional distillation under reduced pressure. There was obtained a fraction boiling at 167–169° C. at 0.6 mm., analyzing:

*Analysis.*—Calc'd. for $C_8H_{18}O_3$: C, 59.23; H, 11.18; M.W., 162. Found: C, 58.73, 58.47; H, 11.08, 11.08; M.W., 157,158.

Infrared spectral analysis showed strong absorption in the hydroxyl region, i.e., in the 3.05μ region. This evidence together with the analysis confirm that the product is 1,4,8-octanetriol.

The unsaturated dilactone used in the example, $C_8H_4O_4$, ([$\Delta^{2,2'(5H,5'H)}$-bifuran]-5,5'-dione), was prepared by charging into a 400 cc. steel pressure reactor 26 g. of acetylene, 200 ml. of acetone, and 1.5 g. of dicobalt octacarbonyl. The mixture was heated with carbon monoxide at a pressure of 1000 atmospheres for 14–17 hours. The product was filtered and the brown solid was extracted with ethyl acetate for 24 hours. The extract was permitted to crystallize and the crystalline material was separated, and dried at room temperature. There was obtained 20 g. of the unsaturated dilactone, $C_8H_4O_4$, M.P. 229° C. after several recrystallizations from acetic acid.

The [$\Delta^{2,2'(5H,5'H)}$-bifuran]-5,5'-dione exists in the form of two structural isomers, which yield suberic acid when hydrogenated with platinum in acetic acid. The normal or low melting form, 230–237° C. is the trans form and the high melting form, 240–248° C. is the cis form. The formulae of these structural isomers of [$\Delta^{2,2'(5H,5'H)}$-bifuran]-5,5'-dione are as follows:

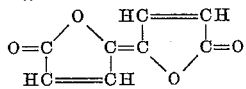
Low melting or trans form

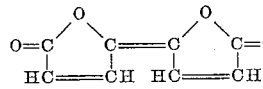
High melting or cis form

Although the hydrogenation of the [$\Delta^{2,2'(5H,5'H)}$-bifuran]-5,5'-dione to the gamma-(delta-hydroxybutyl)-butyrolactone has been effected batchwise, it is to be understood that this is only for convenience and that it can be carried out as a continuous or semi-continuous up-flow, down-flow, co-current, or counter-current vapor or liquid phase operation, with recovery of unconverted reactants for recycling.

The hydrogenation of the [$\Delta^{2,2'(5H,5'H)}$-bifuran]-5,5'-dione to the gamma-(delta-hydroxybutyl)-butyrolactone is effected with a ruthenium catalyst at 200–250° C. and pressures of 1000–10,000 lb./sq. in.

The amount of ruthenium catalyst is at least 0.5% by weight of the [$\Delta^{2,2'(5H,5'H)}$-bifuran]-5,5'-dione. Since the rate of hydrogenation is improved by increasing the catalyst concentration, usually an amount is employed which is in the range of 1 to 15% by weight of the [$\Delta^{2,2'(5H,5'H)}$-bifuran]-5,5'-dione being hydrogenated.

Ruthenium as the free metal or as its oxide or salt can be used. The ruthenium catalyst can be unsupported or supported on a carrier such as charcoal, silica gel, alumina, etc. A suitable method for preparing a charcoal-supported ruthenium catalyst consists in fusing ruthenium or its oxide with sodium peroxide, dissolving the salt, pouring the resulting solution over charcoal and drying the impregnated charcoal. Other methods, however, can be used, e.g., that of U.S. No. 2,074,404 or other procedures based on the reduction of a compound of ruthenium in the presence of a carrier substance.

The steps of hydrogenating the [$\Delta^{2,2'(5H,5'H)}$-bifuran]-5,5'-dione to gamma-(delta-hydroxybutyl)butyrolactone and the hydrogenolysis of the latter compound to 1,4,8-octanetriol are conducted in the presence of an inert, liquid reaction medium to provide better contact between catalyst and reactants and dissipate the heat of reaction. Suitable inert liquid organic reaction media are dioxane, cyclohexane, diethyl ether, ethanol, and the like.

Suitable copper chromite containing catalysts for converting the gamma-(delta-hydroxybutyl)butyrolactone to 1,4,8-octanetriol are those obtained by heating a double chromate of copper and a nitrogen base to its spontaneous decomposition temperature, as described in U.S. Patents 1,746,783, 1,964,001, 2,066,153, and 2,137,407. Especially good results are obtained with a copper chromite promoted with barium chromite, prepared as described in Example III of U.S. Patent 2,040,044.

The hydrogenation of the gamma-(delta-hydroxybutyl)-butyrolactone is a ring cleaving reaction and is effected with copper chromite containing catalysts at temperatures and pressures which are the same as those employed for converting the [$\Delta^{2,2'(5H,5'H)}$-bifuran]-5,5'-dione to the gamma-(delta-hydroxybutyl)butyrolactone.

The amount of catalyst is at least 5% of the gamma-(delta-hydroxybutyl)butyrolactone being hydrogenated. Since the rate of hydrogenation is improved by increasing the catalyst concentration, usually an amount is employed which is at least 15% and preferably 20% by weight of the gamma-(delta-hydroxybutyl)butyrolactone being hydrogenated.

The gamma-(delta-hydroxybutyl)butyrolactone of this invention is a useful intermediate for conversion to the 8-carbon straight chain triol, 1,4,8-octanetriol. The 1,4,8-octanetriol being a polyhydric aliphatic alcohol, is valuable for the preparation of polyesters by reaction with mono and polycarboxylic acids, such as acetic, propionic, glutaric, adipic, benzoic, phthalic, etc., in the presence of an esterification catalyst, e.g., litharge, under conditions providing for the removal of the water formed in the reaction. These polyesters find utility in coating compositions, for fibers, films, and the like, and as plasticizers in polymeric compositions where plasticizers are used, etc.

The process of this invention makes 1,4,8-octanetriol accessible in three steps from cheap, abundantly available acetylene and carbon monoxide.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Gamma-(delta-hydroxybutyl)butyrolactone.

2. Process for preparing a gamma-monolactone which comprises heating and hydrogenating [$\Delta^{2,2'(5H,5'H)}$-bifuran]-5,5'-dione with hydrogen in contact with a ruthenium catalyst, at a temperature of 200 to 250° C., under a pressure of at least 1000 lbs./sq. in., and obtaining as a resulting product gamma-(delta-hydroxygutyl)butyrolactone.

3. Process for preparing a gamma-monolactone which comprises heating and hydrogenating [$\Delta^{2,2'(5H,5'H)}$-bifuran]-5,5'-dione with hydrogen in contact with 1 to 15% of ruthenium dioxide catalyst by weight based on said dione, at a temperature of 200 to 250° C. under a pressure of 1000 to 3000 lbs./sq. in., and obtaining as a resulting product gamma-(delta-hydroxybutyl)butyrolactone.

4. Process for preparing 1,4,8-octanetriol which comprises heating and hydrogenating gamma-(delta-hydroxybutyl)butyrolactone with hydrogen in contact with a copper chromite catalyst, at a temperature of 200 to 250° C., under a pressure of at least 1000 lbs./sq. in., and obtaining as the resulting product 1,4,8-octanetriol.

5. Process for preparing a gamma-monolactone which comprises heating and hydrogenating [$\Delta^{2,2'(5H,5'H)}$-bifuran]-5,5'-dione with hydrogen in an inert liquid organic reaction medium selected from the class consisting of dioxane, cyclohexane, diethyl ether and ethanol and in contact with at least 0.5% of a ruthenium catalyst by weight based on said dione, at a temperature of 200 to 250° C., under a pressure of at least 1000 lbs./sq. in., and obtaining as a resulting product gamma-(delta-hydroxybutyl)butyrolactone.

6. Process for preparing 1,4,8-octanetriol which comprises heating and hydrogenating gamma-(delta-hydroxybutyl)butyrolactone with hydrogen in an inert liquid organic reaction medium selected from the class consisting of dioxane, cyclohexane, diethyl ether and ethanol and in contact with at least 5% of barium copper chromite catalyst by weight based on said lactone, at a temperature of 200 to 250° C., under a pressure of at least 1000 lbs./sq. in., and obtaining as the resulting product 1,4,8-octanetriol.

7. Process for preparing 1,4,8-octanetriol which comprises heating and hydrogenating [$\Delta^{2,2'(5H,5'H)}$-bifuran]-5,5'-dione with hydrogen in contact with a ruthenium catalyst, at a temperature of 200 to 250° C., under a pressure of at least 1000 lbs./sq. in. thereby obtaining gamma-(delta-hydroxybutyl)butyrolactone, adding to the reaction mixture containing said lactone a copper chromite catalyst and heating and hydrogenating said gamma-(delta-hydroxybutyl)butyrolactone with hydrogen in said reaction mixture and in contact with said copper chromite catalyst at a temperature of 200 to 250° C., under a pressure of at least 1000 lbs./sq. in., and obtaining as the resulting product 1,4,8-octanetriol.

8. Process for preparing 1,4,8-octanetriol which comprises heating and hydrogenating [Δ$^{2,2'(5H,5'H)}$-bifuran]-5,5'-dione with hydrogen in an inert liquid organic reaction medium selected from the class consisting of dioxane, cyclohexane, diethyl ether and ethanol and in contact with at least 0.5% of a ruthenium catalyst by weight based on said dione, at a temperature of 200 to 250° C., under a pressure of at least 1000 lbs./sq. in. thereby obtaining gamma-(delta-hydroxybutyl)butyrolactone, adding to the aforesaid inert liquid organic reaction medium containing said lactone at least 5% of barium copper chromite catalyst by weight based on said lactone, and heating and hydrogenating said gamma-(delta-hydroxybutyl)butyrolactone with hydrogen in said inert liquid organic reaction medium and in contact with said barium copper chromite catalyst, at a temperature of 200 to 250° C., under a pressure of at least 1000 lbs./sq. in., and obtaining as the resulting product 1,4,8-octanetriol.

References Cited in the file of this patent
UNITED STATES PATENTS 2,806,048      Jones ------------------ Sept. 10, 1957

OTHER REFERENCES

Breush et al.: Chem. Abst., vol. 47, 6867e (1953).
Richters: Organic Chemistry, vol. 1, third edition, American Photo Offset Reprint (1944), pp. 593 and 594.
Beilstein's: Handbuch, Vierte Auflage, band 3, p. 405.
Rodd: Chemistry of Carbon Compounds, vol. IB, pp. 799 and 800 (1952).
Adkins: Reactions of Hydrogen, pp. 105 (Table 54) and 135 (1937).
Russel et al.: J.A.C.S., vol. 74, pp. 4543-6 (1952).